United States Patent [19]

Gross et al.

[11] Patent Number: 4,688,319

[45] Date of Patent: Aug. 25, 1987

[54] MULTI-LAYER HELICAL SEAM STEEL PIPE

[76] Inventors: Heinz Gross, Reichsmarkstrasse 142, D-46 Dortmund 30; Friedrich-Otto Koch, Auf der Bleiche 44, D-4750 Unna-Massen; Adolf Peeck, Starenweg 56, D-4700 Hamm 1; Werner Wennemann, Wildbannweg 51, D-4600 Dortmund 50, all of Fed. Rep. of Germany

[21] Appl. No.: 652,206

[22] Filed: Sep. 20, 1984

Related U.S. Application Data

[63] Continuation-in-part of Ser. No. 416,478, Sep. 10, 1982.

[30] Foreign Application Priority Data

Sep. 11, 1981 [DE] Fed. Rep. of Germany ....... 3135966

[51] Int. Cl.$^4$ ....................... B21D 39/00; B23P 11/02; F16L 9/14
[52] U.S. Cl. ....................................... 29/523; 29/507; 138/150
[58] Field of Search ................. 138/150, DIG. 5; 29/506, 507, 523, 456

[56] References Cited

U.S. PATENT DOCUMENTS

| | | | |
|---|---|---|---|
| 1,696,725 | 12/1928 | Murray | 138/150 |
| 2,476,666 | 7/1949 | Keller | 138/150 |
| 3,504,513 | 4/1970 | Black | 29/507 |
| 3,746,050 | 7/1973 | Born et al. | 138/150 |
| 4,332,073 | 6/1982 | Yoshida | 29/523 |
| 4,359,811 | 11/1982 | Monroe | 29/523 |
| 4,377,004 | 3/1983 | Yoshida | 29/523 |

*Primary Examiner*—Howard N. Goldberg
*Assistant Examiner*—Steven Nichols
*Attorney, Agent, or Firm*—Horst M. Kasper

[57] ABSTRACT

A method for production of a multi-layer gap-less steel pipe. An inner pipe and an outer pipe are formed from thermomechanically rolled steel strip with high notched bar impact strength by welding. The individual helical welding seam steel pipes of about the same lengths are matched with a difference of less than about one percent between the outer diameter of the inner pipe and the inner diameter of the outer pipe. The matched inner pipe is inserted into the outer pipe and the pipes are mechanically expanded with diameter control to a preset outer diameter of the multi-layer steel pipe. The resulting multi-layer steel pipe has the inner pipe disposed under compression and the outer pipe layer disposed under stress. The presence of a compression stress in the inner pipe provides a means opposed to hydrogen sulfide stress corrosion. The advantages of the helical welding seam steel pipes can be combined such as economic production, advantages relating to crack formation and crack propagation stopping, and the availability of high internal pressure loads upon use of thin, economic steel strip of different yield strength.

11 Claims, 12 Drawing Figures

FIG. 1
FIG. 1a
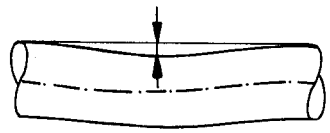
FIG. 1b
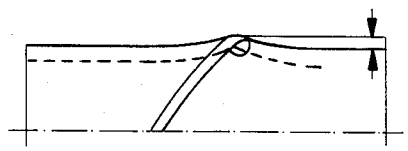
FIG. 1c
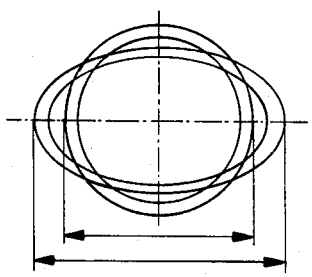
FIG. 1d
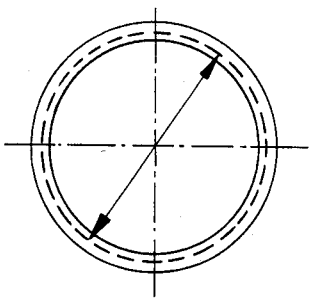

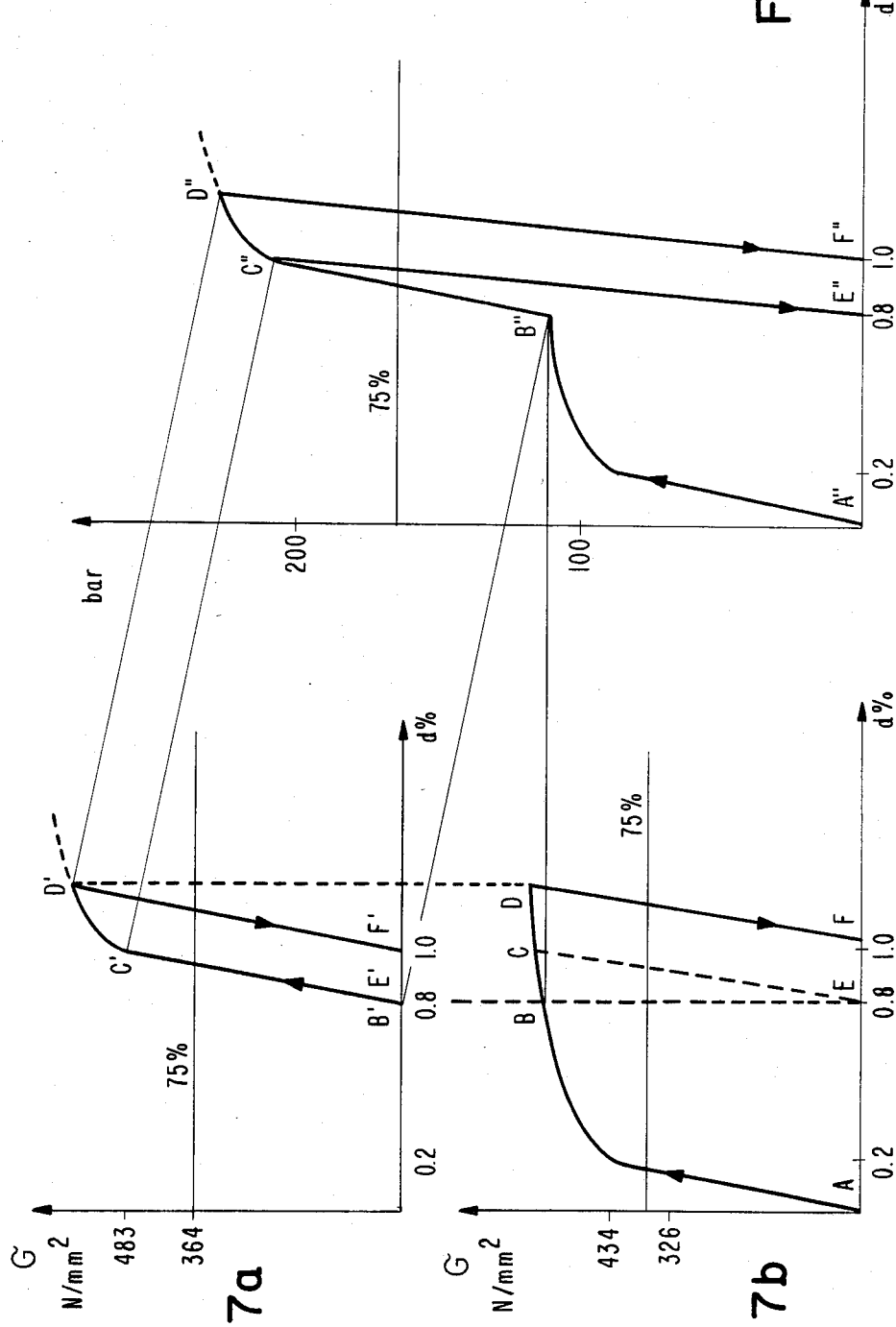

MULTI-LAYER HELICAL SEAM STEEL PIPE

CROSS-REFERENCE TO RELATED APPLICATIONS

This application is a continuation-in-part application of another application filed Sept. 10, 1982 and bearing Ser. No. 416,478. The entire disclosure of this latter application, including the drawings thereof, is hereby incorporated in this application as if fully set forth herein.

BACKGROUND OF THE INVENTION

1. Field of the Invention

The present invention relates to a method of production of a multi-layered steel pipe as well as to a multi-layered steel pipe produced from helical welding seam pipes.

2. Brief Description of the Background of the Invention Including Prior Art

It is known that pipes with a laminatad, sheet, or layer construction can withstand high internal pressures. Therefor, frequently two inserted pipes are connected to a multi-layer pipe by drawing such as taught for example in German Patent Application Laid Open No. DE-OS 2,501,156 and in U.S. Pat. No. 4,125,924. Based on the technical manufacturing requirements this method is limited to small pipe diameters with homogeneous surfaces.

Another possibility of producing multi-layer pipes is taught in German Patent Application Laid Open No. De-OS 3,000,665, where the inner tube is expanded by way of a steel ball being pressed through the pipe. Again, this method allows only to produce multi-layer pipes having a small diameter with a smooth inner surface.

In order to produce high pressure pipelines with large diameters production has been changed over some time ago to pipes with strengthening bands as taught in German Patent No. DE-PS 936,981, where the pipe was expanded into loose circumferentially disposed girths by way of pressurized liquid. This process carries the disadvantage that the pipe can bulge out between the strengthening bands based in many cases on unavoidable small wall thickness deviations or other flaws or unsound material sections. Thus no uniformly constant pipe diameter is produced.

This disadvantage is avoided according to a method according to the German Patent No. DE-PS 548,576. This patent teaches a production process for longitudinally welded high pressers pipes of large diameter in multiple layer construction, which are provided with long running longitudinal welded seam jackets instead of strengthening bands, and the pipes are expanded by liquid pressure. This system at the same time employs the effect of material improvement by cold-working, but it is associated with the decisive disadvantage that the tube pieces protruding beyond the jacket have to be cut off, which renders this multi-layer pipe uneconomical.

A similar process is known from the article "Hooped" pipe, Pipeline and Gas Journal, November 1973. One might see with hindsight that a corresponding not described provision of a hydraulic expansion process avoids the above disadvantage of cutting off the ends. This process allows to produce work-hardened high pressure pipes for example for gas pipes up to a diameter of 1422 millimeters (56 inches) and wall thicknesses of 16 millimeters (0.63 inches) with a yield strength of the material of up to about 412 Newton per square millimeter for the pipe to be expanded.

Larger pipe diameters and larger operating pressures than about 45 bar were not believed to be possible, that is requirements, which are today standard for gas pipelines with operating pressures of 70 bar and which are expected to rise to 100 bar. This system in addition carries the disadvantage that the outer jacket pipes do not correspond to the length of the inner pipes and that therefor the finished multi-layer pipe is not accessible to a usual water pressure and non-destructive testing of the complete pipe body. In addition, the system requires a special strengthening with bands of the pipeline in the area of the butt welding connections, such as is taught for example in the French Pat. No. FR-PS 2,262,246. This method is opposed to a far reaching automation of the butt welding process with the usual equipment employed by pipe laying organizations. Furthermore, there are expected to exist problems with the adhesion of the outer pipe insulation, which is always required with pipeline pipes based on the danger of corrosion of steel pipes. It was indicated above that there are disadvantages connected with hydraulic expansion in case of flaws and unsound regions in the work piece to be processed.

Another disadvantage of this system is associated with the employment of longitudinal seam pipes. Based on their ovality and their nonevenness the inner pipes have to be rounded before being inserted into the outer pipes as can be gathered from a further publication relating to this system entitled "Hooped Pipe"-Pipe Line Industry, January 1975. According to this further development in addition pipes are to be produced with a diameter of up to 2 meter as longitudinal seam pipes in pressure stages of up to 150 bar, however based on the necessarily employed lengths of pipe in connection with three roller bending machines uneconomically short lengths result. The expanding is here possible with a liquid pressure of up to 90 percent of the yield stress limit of the outer pipe, where however the initial yield stress of the inner pipe cannot exceed 412 Newton per square millimeter.

However, variants of this systems provide two advantages which are employed in the present invention:

Materials of different wall thickness and strength can be employed for the outer and, respectively, inner pipe.

After the expansion pressure stresses are generated in the inner pipe, the advantages of which will be disclosed in the present invention, but these pressure stresses were not taught in the reference.

There is known a further method for the production of multi-layer steel pipes according to European Patent Disclosure No. EP-AL-0015712, where the outer pipe is heated and the inner pipe is undercooled such that a diameter difference results, which allows an insertion of the pipes. Then the temperature equalization is obtained under simultaneous hydraulic expansion of the inner pipe. Apart from the fact that this process appears to be only usable for two layered pipes, the high energy requirements appear to be justified only for the otherwise problem plagued connection of a highly alloyed or stainless steel pipe as an inner pipe with a less expensive steel as an outer pipe.

A big problem has proven to be the safety against crack formation and crack propagation at the expansion of the inner pressures in gas pipelines to more than 70 bar. It is known that cracks propagate in steel pipe with a speed of up to 330 meters per second and that they destroy several kilometer of pipe completely. The state of the art recited up to now has not provided any solution for this problem.

A large number of proposals have been made as to the local limiting of such cracks such as for example by way of winding steel cables around regular pipe lines as taught in German Petit Patent No. DE-GM 7,709,311. These windings interfere substantially with the laying of the pipe and its installation at gas pipes with typical dimensions of 1420 millimeter diameter and wall thicknesses of 17.5 millimeter at a distance of only from 9 to 200 meter and widths of up to two meter.

For this purpose either the pipe insulation is damaged if the cable is wound on top of it or the insulation of the winding has to be performed manually upon interruption of the automatic insulating process.

It is known that helical welding seam pipes are provided with a substantially larger resistance against crack propagation and crack formation as compared with longitudinally welded pipes based on the high notched bar impact strength in the main stress direction, which is the circumferential direction of the pipe, which depending on the seam helix angle is either equal or slightly below the value for the direction of rolling of a steel strip. This effect is employed according to U.S. Pat. No. 3,698,746 by inserting a helical welding seam pipe into a regular one wall pipeline as a crack propagation stopper. However, the advantages of a laminate type construction at a multi-layer steel pipe are not disclosed.

Based on other advantages, which also become effective according to the present invention, of the helical welding seam steel pipes, where economic steel strip of large lengths is employed in a continuous production process, the production of multi-layer high pressure tubes has already been proposed by simultaneous forming and welding of several steel strips disposed on top of each other, compare German Patent Laid Out Nos. DE-AS 1,944,587, DE-AS 1,963,805, DE-AS 2,745,389 and corresponding U.S. Pat. No. 4,247,033. Apart from the large equipment requirements this kind of production allows only to a very limited extent the generation of a pressure stress in the inner pipe, and practical experience has even shown that in the case of the teaching of No. DE-AS 1,963,805 necessarily and unavoidably gaps are produced between the pipe layers.

This internal pressure stress is of course desired in the laminate construction.

Mechanical expanders are known which are capable of expanding a pipe depending on the length, that is by a certain fixed amount. In the case of the production of helical welding seam pipes with welding seam reinforcements there are known specially adapted aggregates according to German Patent Applications Laid Open Nos. DE-OS 2,627,172 and DE-OS 2,641,051, which also are useful according to the present invention.

SUMMARY OF THE INVENTION

1. Purposes of the Invention

It is an object of the present invention to provide an improved steel pipe and a method for its production where there are combined the advantages of the laminate construction of pipes, the crack formation and crack propagation advantages of helical welding seam pipes as well as the economic advantages connected with the employment of economic, but high-strength, thermomechanically rolled steel strips.

Is is another object of the present invention to employ steel pipes having exact outer diameters and having as desired two or more layers for the formation of larger wall thicknesses for high pressure gas pipes with over 80 bar operating pressure.

It is a further object of the present invention to provide a steel pipe which is substantially resistant against hydrogen sulfide corrosion and which allows the use of different materials with different mechanical qualities and thicknesses for the inner and outer pipe with an expansion requirement as low as possible for the individual pipes.

These and other objects and advantages of the present invention will become evident from the description which follows.

2. Brief Description of the Invention

According to one aspect the invention provides a method for production of multi-layer gap-less steel pipes which comprises matching individual helical welding seam steel pipes of about the same length with a difference of less than about one percent between the outer diameter of the inner pipe and the inner diameter of the outer pipe, inserting the matched inner pipe into the outer pipe, and mechanically expanding with diameter control the pipes to a preset outer diameter of the multi-layer steel pipe.

The helical seams of the individual pipes can be welded such that at least the adjoining pipe surfaces do not exhibit welding reinforcements. The outer pipes can be expanded beyond their yield strength. The inner pipe can be inserted into the outer pipe without provision for prior geometrical changes after the seam welding step. The surfaces of the steel pipes adjoining in the multi-layer pipe can be descaled before insertion of the inner pipe. The peakings at the helical welding seams of the inner pipe can be kept lower as compared to those of the outer pipes. The individually produced outer pipes can be cut shorter by a certain amount as compared to the inner pipes, where the certain amount corresponds to the amount of relative shortening of the inner pipe resulting from the expansion. The individually produced helical welding seam pipes can be subjected to a material and welding seam and/or a surface control. The welding seam reinforcements on the inside of the inner pipe are preferably finished before the insertion of the inner pipe into the outer pipe.

There is also provided a multi-layer gap-less steel pipe consisting of inner and outer helically welded pipes formed from thermomechanically rolled steel strip with high notched bar impact strength where the inner pipe has compressive stress and the outer pipe has tensile stress and having its inside adjacent to the outside of the inner pipe.

The multi-layer gap-less steel pipe can be produced by mechanically expanding individual helical welding seam pipes inserted into each other. The inserted individual steel pipes can be expanded with the aid of press shoes applied from the inside of the inner pipe. The yield strength of the outer pipe can be larger than 450 Newton per square millimeter and the yield strength of the inner pipe may be more than 10 percent less than the yield strength of the outer pipe before the expansion step. The helical seams of the inner pipe and of the outer pipe can have different helix angles. The helix angle of the welding seam of the outer pipe can have an oppositely running helix angle as compared to the one of an inner pipe. The distances between the helical welding seams can be equal in the final state of the multi-layer steel pipe for both the inner and the outer pipe.

In accordance with the present invention all known advantages of the helical welding seam pipe are employed in a sensible way for the production of a multi-layer gap-free high-strength pipe line substantially stable against crack formation and crack propagation and stress corrosion cracking and adapted to highest pressures at large diameters.

In particular, the effect is employed in the present invention, which is known from other systems that a pipe subjected to pressure stress on the inside is not susceptible to hydrogen sulfide corrosion, which can occur in sulfur containing natural gas.

Based on the known larger geometrical perfection of helical welding seam pipes as compared to longitudinal welding seam pipes, the difference between the inner diameter of the outer pipe as compared to the outer diameter of the inner pipe can be kept under about 1 percent, and this results in a short deformation length during the expansion step. This allows to shorten the production time and the stroke of the expander becomes smaller as well as its total dimension.

Mechanical expanders can be as desired and accurataly controlled over certain path lengths and thus an exact outer diameter can be set for the multi-layer pipe, which upon expansion with liquid pressure is only possible by employing of an outer mold. Using mechanical expanders there are produced gap-less multi-layer pipes even upon employing different material hardnesses within a pipe layer, since the expansion does not depend on the pressure but on the path of the expansion length. Upon employment of helical welding seam steel pipes of the same length with consideration for a shortening of the individual pipes based on the expanding the same length can be achieved for the different layers with the consequence that such tube can be girth welded during the laying of a pipeline and that no loss in material occurs by cutting off of excessive lengths. The advantages of these pipes in view of crack formation and the like have been recited above as being based on the favorable position of the main stress direction versus the direction of the steel strip rolling.

Such a multi-layer pipe according to the present state of the art, where hot broad strip can be safely produced with a thickness of about 16 or 18 millimeters and the quality X 70, can be produced without a problem such as for example at a two layer pipe with up to about 32 or 36 millimeter total thickness. Thus the pipeline pressures to be employed in the future for gas pipes are certainly covered in any case, and, if desired, the wall thickness can of course also be produced by employing three 11 millimeter thick helical welding seam steel pipes expanded while inserted.

The gap-less production of the pipes usually requires the finishing of the welding seam reinforcement. According to the present invention it is possible to weld such that no welding seam reinforcement is generated.

According to a further feature of the invention the outer pipe during the joint expansion with the inner pipe is to be expanded beyond its yield stress. This results in the advantage, that the stress difference between the outer and inner pipe becomes larger, thus also larger pressure stresses can be fed to the inner pipe.

Since helical welding seam pipes exhibit exact geometrical dimensions, they do not need to be straightened or rounded before being inserted into each other and this results in favorable consequences for an advantageous stress distribution in a multi-layer pipe. The stresses of an individual pipe are already relatively even distributed. In case of high requirements or as a step for the preparation of the surfaces, the individual pipes can be descaled before being inserted. Beside the surfaces later being disposed adjacently, of course the other surfaces can be prepared at the same time for a pipe insulation. According to a further feature of the invention, the peaking generated at the production of the helical welding seam pipes should be kept lower in the seam region of the inner pipe as compared with the outer pipes, such that upon expansion into each other the peakings are inserted into each other. A further advantage is the lower diameter expansion of the inner pipe at lower peakings.

Upon radial contraction of the multi-layer pipes after the expansion the pipe layers expand slightly in longitudinal direction. This fact has to be taken into consideration by shortening the outer pipes expanding in total relatively less based on the smaller deformation versus the inner pipes. As compared to the unexpanded starting stage, the inner pipe remains in a radially relatively more expanded state as compared with the outer pipe and therefore the longitudinal total shrinkage compared to the starting material is larger for the inner pipe than for the outer pipe thus requiring for final equal length of both pipes that the inner pipe is initially slightly longer. Thus a multi-layer pipe can be produced where all layers of the multi-layer pipe are exactly of equal length. This provides the advantage that such a pipe can be easier subjected to a 100 percent test at the water pressure test as well as also at the non-destructing-test and can further be subjected to the manual dimensional and surface controls.

It appears to make sense in some cases after production of the final multi-layer pipe to perform another test of the basic material, that is of the region between the welding seams. It would be necessary for this that the welding seams would be superposed as close as possible. In order to achieve this therefor the helix angles of the welding seams at the inner pipe have to agree with the helix angles of the welding seams at the outer pipe in the final state. This means that the helix angles have to be initially before insertion of the inner pipes into the outer pipes correspondingly different by selection of corresponding angles and strip width in order to make up for the above described longitudinal contraction of the pipes upon expansion.

According to the invention it is advantageous for connecting multi-layer pipes to a pipeline with a joint girth weld if circumferentially running homogenization foils are inserted between the pipe layers at the pipe ends before the expansion into each other. Such a metallic foil would render superfluous a joint welding of the pipe ends to each other or the welding of a flange before the butt welding of the multi-layer pipes to a steel pipeline.

Advantageously, the individually produced helical welding seam steel pipes are subjected to a basic materials, welding seam and surface control before their insertion into each other in order to assure that already faulty or defective pipes are not processed to multi-layer pipes.

In order to increase production speed during the expansion step, it can be advantageous to finish initially possible welding seam reinforcements in the interior of the inner pipe and then to provide the expansion with a regular pipe expander, that is a pipe expander lacking any spiral grooves. In case of short pipe lengths an expander can of course be employed which expands the pipes all at the same time and not as was done conventionally based on reasons of diminished machine technical expenditure by stepwise shifting and advancing the expander inside the pipe.

High-strength thermomechanically rolled steel strips are more expensive with increasing stages of strength. Therefor, it is advantageous according to the invention to employ a steel of high strength for the outer pipe and to employ less expensive steels of less strength for the inner pipes, where depending on the application requirements an inner pipe of the lowest strength is chosen.

Layer pipes which comprise individual helical welding seam pipes are particular effectively employed against crack propagation, if the helical welding seams of the individual pipe layers cross over, that is if the helix angles differ or even have an opposite sign for the slopes of the different pipes. Thus there is always provided a substantial resistance to the propagation of cracks from welding seam to welding seam, which can stop a crack from propagating further.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

In the accompanying drawing in which are shown several of the various possible embodiments of the present invention:

FIGS. 1a–1d are views of qualitative cross-sectional representations of the tolerances encountered at helical welding seam pipes, FIGS. 7a–7c are views of diagrams showing schematically the expanding and contracting operation by way of stress-strain diagrams for steels of the quality X 70 for the outer pipe and X 63 for the inner pipe of a two layer pipe as well as a pressure-strain diagram for this multilayer pipe.

DESCRIPTION OF INVENTION AND PREFERRED EMBODIMENTS

In accordance with the present invention there is provided a method for production of gap-less steel pipes by insertion of individually produced steel pipes of different diameter followed by expansion with internal pressure where the individual steel pipes are produced as helical welding seam steel pipes of the same length with a difference of less than one percent between the outer diameter of an inner pipe and the inner diameter of an outer pipe and where the helical welding seam pipes after insertion are mechanically expanded by way of a diameter controlled mechanical expander to a pre-set outer diameter of the multi-layer steel pipe.

The inner pipe of the rssulting steel pipe is provided with pressure stresses and the outer pipe of the resulting steel pipe is provided with tensile stresses. The pipe starting material is thermomechanically rolled steel strip of high notched bar impact strength and the individual helical welding seam steel pipes were subjected to a mechanical expansion while inserted into each other.

Referring now to FIG. 1 there are shown qualitatively the possible deviations of a helical welding seam steel pipe from the theoretically exact shape. FIG. 1a represents deviations from straightness from the longitudinal axis, FIG. 1b the so-called peaking, which is generated by a non-exact bending of the edges of the steel strip during production of the individual helical welding seam pipes on the two sides of the helical welding seams. FIG. 1c shows a possible ovality deviation of the individual steel pipes from each other, while FIG. 1d presents deviations from the nominal diameter of a helical welding seam steel pipe as can be caused by tolerances such as for example strip sabering, which was not completely controlled.

In order to provide for an uninterrupted production of for example a two layer pipe all geomtrical tolerance have to be matched to each other, that is it has to be assured that each pipe as desired from the production of the inner pipes is adapted to each pipe as desired from the production of the outer pipes. This kind of problem is known for example from the series production of automobiles. This means in the context of the helical welding seam pipes the following:

There has to be matched an inner pipe with the largest
    outer diameter
    ovality
    non-straightness
    peaking
to an outer pipe with the lowest
    outer diameter
    largest ovality staggered by 90 degrees versus a corresponding inner pipe
    non-straightness
    peaking.

Figure 2:
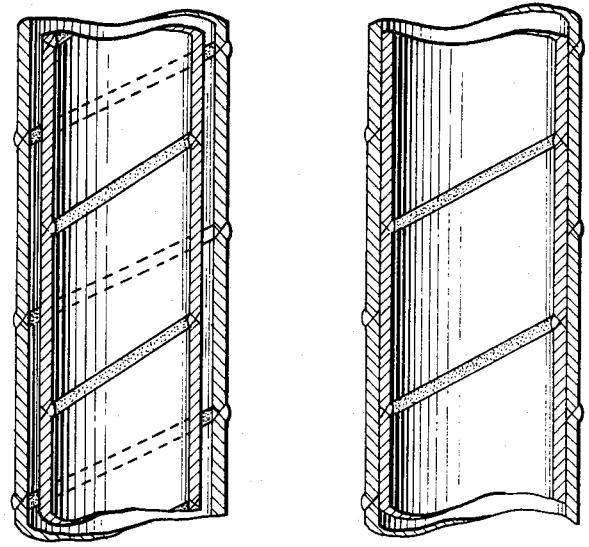
FIG. 2 is an in part sectional view of helical welding seam pipes having the same helix angle, but with the welding seams displaced against each other.

FIG. 2 shows two inserted helical welding seam steel pipes without welding seam reinforcement at the opposing surfaces before and after expanding. The welding seams are disposed opposite to each other as desired.

Figure 3:
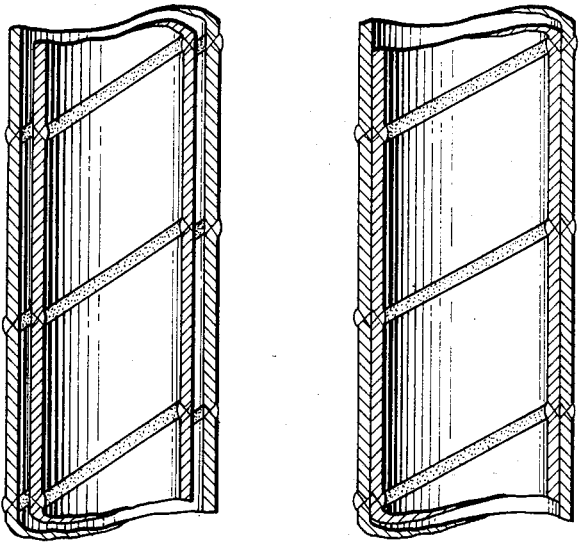
FIG. 3 is an in part sectional view of helical welding seam pipes having the same helix angle and with opposing helical welding seams.

If in certain cases a peaking should be unavoidable at the individual production of the helical welding seam pipes, then according to FIG. 3 in case of an equal helix angle of the welding seams the inner pipe can be disposed with respect to the outer pipe such that the peakings are inserted into each other in the finished pipe. These peakings are in the finished pipe of course only then present if there was no expansion to far beyond the yield stress of the outer pipe.

Figure 4:
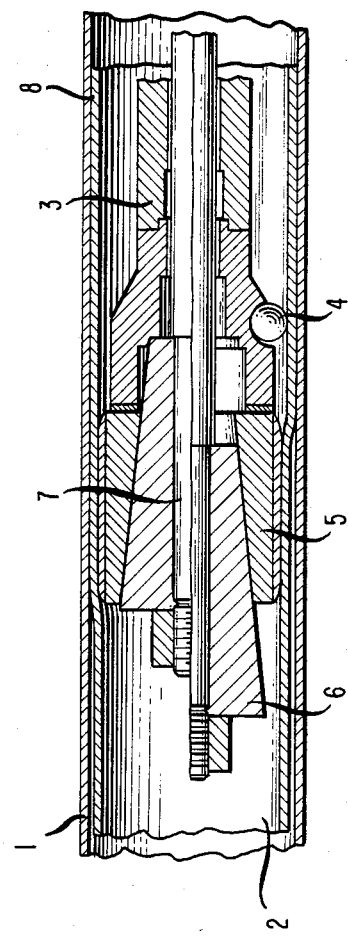
FIG. 4 is a view of a longitudinal section of a mechanical pipe expander in operation.

FIG. 4 shows a mechanical expander in operation. The expander running on rollers 4 is advanced step by step in the inner pipe 2 corresponding to the length of the press shoes with a support pipe 3. In the lower part of FIG. 4 there is shown the retracted position of the press shoes 5, which are radially shifted via tensioning wedges 6 and the pull rod 7 during the advancing of the expander. The expansion step can be recognized in the upper part of FIG. 4, the inner pipe 2 is stretched so long until its outer surface contacts the inner surface of the outer pipe 1, then as shown the two pipes are jointly expanded to the predetermined outer diameter of the multi-layer pipe 8. The slight decrease in diameter of the multi-layer pipe based on elastic back springing is not indicated in FIG. 4.

Figure 5:
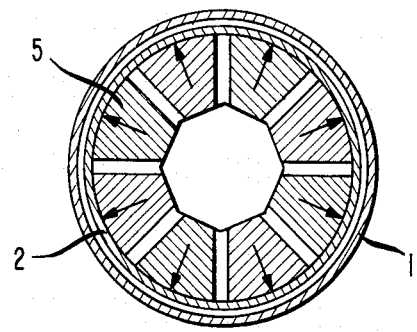
FIG. 5 is a view of a cross-section through an expander head of a mechanical pipe expander according to FIG. 4.

FIG. 5 shows a sectional view through the expander head during the expanding of the inner pipe 2 disposed inside of the outer pipe 1. The press shoes 5 exert a uniform pressure onto the pipe wall.

Figure 6:
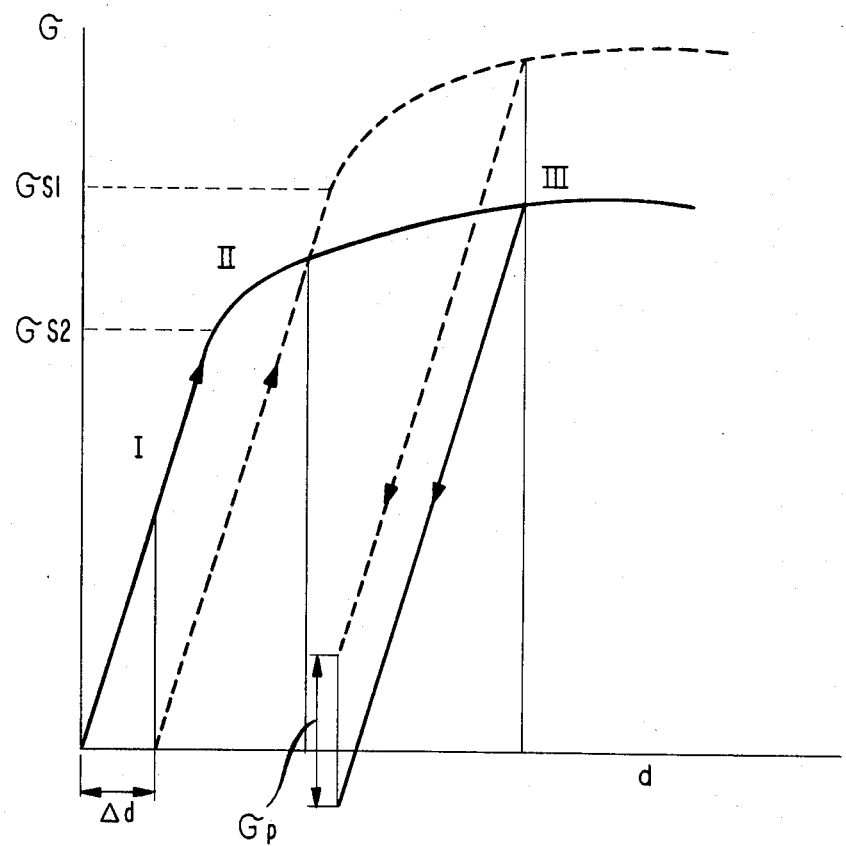
FIG. 6 is a view of a diagram showing the qualitative course of the expanding and contracting in a stress-strain diagram.

The qualitative course of an expanding operation in the production of a two layer pipe from an inner pipe with a lower yield stress as compared to the outer pipe is shown in FIG. 6 in a stress strain diagram. The stress $\sigma$ (sigma) is plotted versus the strain, that is the change in diameter of the individual pipes and of the multi-layer pipe. An inner pipe is mechanically expanded as shown with the solid line in FIG. 6 starting with its outer diameter and initially by elastic deformation to the point I, where its outer diameter reaches the inner diameter of the outer pipe. Thus at this point the diameter difference d has been bridged. Then the two pipes are jointly expanded further. At a diameter II, where the inner pipe is plastically expanded, the stress in the outer pipe becomes larger than the stress in the inner pipe. A further expansion to the predetermined final diameter of the multi-layer pipe as shown at point III also loads the outer pipe to the plastic deformation region. After termination of the expanding the multi-layer pipe relaxes, the two pipe diameters are reduced by the same amount. A tension stress remains in the outer layer (outer pipe) and a pressure stress remains in the inner layer (inner pipe). The difference in stress (pressure stress $\sigma_p$) provides for a permanent combination of the pipe layers.

In case of an expansion of the outer pipe up to the plastic region as shown in FIG. 6 the pressure stress and therewith the assurance against separation of the pipe layers is larger as compared to the loading of the outer pipe to below the yield stress.

FIG. 7 shows in analogy to FIG. 6 the stress-strain diagrams separately for an outer pipe from material X 70 (yield stress 484 Newton per square millimeter) and an inner pipe from material X 63 (yield stress 434 Newton per millimeter square) (FIGS. 7a and 7b). Material X 63 and X 70 are steel grades specified e.g. in API Spec 5 LS (American Petroleum Institute Specification for spiral-weld line pipe) with a minimum yield strength of 63,000 psi respective 70,000 psi. At an operating pressure of 75 percent of the yield strength (364 Newton per square millimeter) for the individual outer pipe, the stress in the inner pipe would already be unallowably excessive over its 75 percent value (326 Newton per square millimeter). A transfer of the situation into a pressure strain diagram is shown in FIG. 7c for a multi-layer pipe with 1422 millimeter outer diameter, $2 \times 14.2$ millimeters wall thickness=28.4 millimeter at a gap between outer pipe and inner pipe of 5.7 millimeter corresponding to about 0.8 percent diameter difference.

At an operating pressure of up to 75 percent of the yield stress, the two pipes are only loaded in the elastic region, which corresponds to an operating pressure of far more than 100 bar. The pressure stress between the two pipe layers remains maintained and therewith the advantage against stress corrosion.

Similar to the above described example employing two pipes inserted to form a multi-layer pipe, of course also three or more pipe layers can be provided in a multi-layer pipe.

It will be understood that each of the elements described above, or two or more together, may also find a useful application in other types of metal fabricating system configurations and pipe processing procedures differing from the types described above.

While the invention has been illustrated and described as embodied in the context of a multi-layer helical welding seam steel pipe, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

We claim:

1. A method for production of multi-layer gap-less steel pipes comprising
    matching individual helical welding seam steel pipes of about the same length with a difference of less than about one percent between the outer diameter of the inner pipe and the inner diameter of the outer pipe;
    inserting the matched inner pipe into the outer pipe; and mechanically expanding with diameter control the pipes to a preset outer diameter of the multi-layer steel pipe.

2. The method for production of multi-layer gapless steel pipes according to claim 1 further comprising welding the helical seams of the individual pipes such that at least the adjoining pipe surfaces do not exhibit welding reinforcements.

3. The method for production of multi-layer gapless steel pipes according to claim 1 further comprising expanding the outer pipe beyond the yield strength.

4. The method for production of multi-layer gapless steel pipes according to claim 1 wherein the inner pipe is inserted into the outer pipe without provision for prior geometrical changes after the seam welding step.

5. The method for production of multi-layer gapless steel pipes according to claim 1 further comprising descaling the surfaces adjoining in the multilayer pipe before insertion of the pipe.

6. The method for production of multi-layer gapless steel pipes according to claim 1 further comprising pretreating the surfaces adjoining in the multi-layer pipe before insertion of the pipe.

7. The method for production of multi-layer gapless steel pipes according to claim 1 further comprising keeping peakings at the helical welding seams of the inner pipe lower as compared those of the outer pipes.

8. The method for production of multi-layer gapless steel pipes according to claim 1 further comprising cutting the individually produced outer pipes by a certain amount shorter as compared to the inner pipes, where the certain amount corresponds to the amount of relative shortening of the inner pipe resulting from the expansion.

9. The method for production of multi-layer gapless steel pipes according to claim 1 further comprising inserting a homogenization foil between the inner and the outer pipe at the pipe ends before the expansion.

10. The method for production of multi-layer gapless steel pipes according to claim 1 further comprising subjecting the individually produced helical welding seam pipes before the insertion step to a material and welding seam and/or surface control.

11. The method for production of multi-layer gapless steel pipes according to claim 1 further comprising finishing the welding seam reinforcements on the inside of the inner pipes before the insertion into the outer pipes.

* * * * *